United States Patent [19]

Saumell

[11] 4,091,533
[45] May 30, 1978

[54] PIPE-CUTTING APPARATUS

[76] Inventor: Jon Saumell, 16769 Redwood St., Fountain Valley, Calif. 92708

[21] Appl. No.: 587,910

[22] Filed: June 18, 1975

[51] Int. Cl.² .............. B23D 21/06; B26B 27/00; B26D 3/16
[52] U.S. Cl. .................................. 30/95; 30/116
[58] Field of Search ................. 30/93, 94, 95, 116

[56] References Cited

U.S. PATENT DOCUMENTS

| 610,829 | 9/1898 | Raney | 30/116 UX |
|---|---|---|---|
| 858,997 | 7/1907 | Low | 30/116 UX |
| 1,623,833 | 4/1927 | Geis | 30/93 X |
| 1,961,172 | 6/1934 | Schneider | 30/116 |
| 2,442,063 | 5/1948 | Stone | 30/95 X |
| 2,762,122 | 9/1956 | Hermann | 30/116 |
| 2,796,663 | 6/1957 | Karnes | 30/102 |
| 2,987,598 | 6/1961 | Chace et al. | 30/116 X |
| 3,732,618 | 5/1973 | Lorenz | 30/97 |

Primary Examiner—James L. Jones, Jr.
Assistant Examiner—J. T. Zatarga

[57] ABSTRACT

A portable pipe-cutting apparatus, for use in cutting plastic, rubber and other non-metallic pipes or tubing and thin-wall metal pipes and tubing, having a rotatable cutter head for supporting a cutting element therewith, the cutting element being a serrated, plain wire, or cutting tooth. The cutting head is adapted to be opened for engaging and releasing the pipe. Because of its light weight and simple design, the cutter can be used in a variety of awkward working situations.

1 Claim, 3 Drawing Figures

PIPE-CUTTING APPARATUS

BACKGROUND

1. Field of the Invention

This invention is an improvement in the field of pipe cutters. It relates particularly to the field of plastic and non-metallic pipe-and-tube cutters and thin-wall metallic pipe-and-tube cutters.

2. Description of the Prior Art

As is well known in the art, various types of cutting tools for pipes and tubes are presently available. However, several problems and difficulties are encountered in providing proper cutting under difficult situations. Many of the present cutting tools are limited to heavy-wall, metallic pipe cutters, or pipe cutters that are specifically designed for thin-wall, metal tubes. With the new-present-day plastic materials that are used in the plumbing industry, there is a need for a very simple but reliable cutting device.

The following are various issued patents that relate to the pipe-cutting field and are of interest for the presently disclosed invention.

U.S. Pat. No. 29,602, issued in 1860, describes an apparatus consisting of two chucks wherein one is stationary and the other one is adapted to revolve. The revolving chuck is provided with a chisle to bevel and cut metallic pipes.

U.S. Pat. No. 258,973, issued in 1882, describes an improvement in pipe-cutting machines having roller cutters which are automatically fed toward the center of the pipe to be cut until it is severed from the body thereof.

U.S. Pat. No. 760,128, issued in 1904, is one which has as its object many of the same objectives of the present invention. That is, it is intended to be simple, efficient and able to be employed in the field or by the do-it-yourselfer. It is lightweight and can be used in the construction industry as well as in the do-it-yourself field. However, it differs from the present invention in that the cutter-rollers used for severing the pipe are easily dulled, nonreplaceable and more expensive than wire-cutting elements. The overall construction is also more complex.

U.S. Pat. Nos. 2,796,792, issued in 1957; 3,431,646 and 3,732,618 further describe the prior art in this particular field. All of these devices are intended to cut metallic pipes particularly metallic pipes of rather heavy gauge, such as used in the plumbing field.

SUMMARY

The present invention is an improvement over the apparatuses disclosed in the prior art, and is particularly suited for cutting plastic, rubber or thin-walled metal tubing or pipes. Briefly, the device comprises a rotatable cutter head adapted to be received over the end of a pipe and positioned at a selective cutting point. The cutter head includes an annular support body having a forwardly extending yoke member. The yoke provides cutting stabilization during the cutting rotation of the cutter head. A bridge member integrally connects the annular body and yoke as a single unit, wherein a key member is rotatably disposed for operable engagement with an arcuate arm pivotally attached to the annular body.

Ratchet teeth are formed adjacent the free end of the arcuate arm for direct engagement with the teeth of the key member, whereby the arm is adjustable relative to the pipe surface being cut.

Accordingly, there is provided a cutting element such as a serrated or non-serrated, piano-type wire, this wire being mounted to the adjustable arm. By tightening the cutting arm with the key while the head is being rotated, the piano wire cuts through the pipe wall, thereby cutting off the pipe at the desired position. To aid in the cutting and in the positioning of the arcuate arm, there is also provided a locking means to hold the key and arm in the proper cutting position relative to the particular cut in the pipe.

OBJECTS AND ADVANTAGES OF THE INVENTION

It is an object of this invention to provide a pipe-cutting tool that can be used by the construction industry, and can be easily carried by those working in the field.

It is a further object of this invention to provide a pipe-cutting device that uses a corrugated, serrated or plain wire under tension to achieve the cutting effect.

It is another object of this invention to provide a cutting device for thin-walled metal tubing or pipes and plastic, rubber and other non-metallic tubing or pipes in which the cutting blade would be of serrated or plain wire which is easily removed so the device can be repaired on the field with the cutting edge being replaced as needed.

It is still a further object of this invention to provide a cutting device for thin-walled metal tubing and pipes, and plastic, rubber and other non-metallic tubing or pipes, in which the cutting means is an adjustable arc-shaped arm with pointed projections forming cutting teeth.

It is an additional object of this invention to provide a device for cutting thin-walled metal tubing and plastic or rubber tubing or pipes which can be easily engaged to the part to be cut, whether it is suspended above one's head, partilly buried in the ground, or in some other difficult access situation.

It is still another object of this invention to provide a device for cutting thin-walled metal tubing and plastic, rubber or other non-metallic tubing or pipe which can be economically constructed of lightweight materials and would be so inexpensive that it could be thrown away when no longer usable.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE PREFERRED EMBODIMENT

Figure 1:
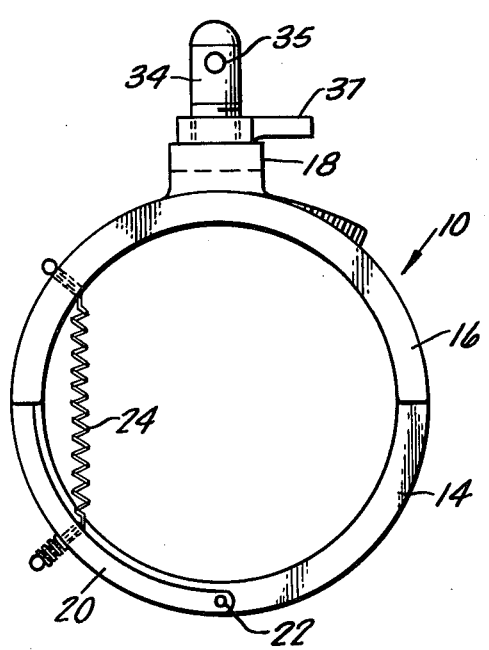
FIG. 1 is a front-elevational view of the present invention.
Figure 2:
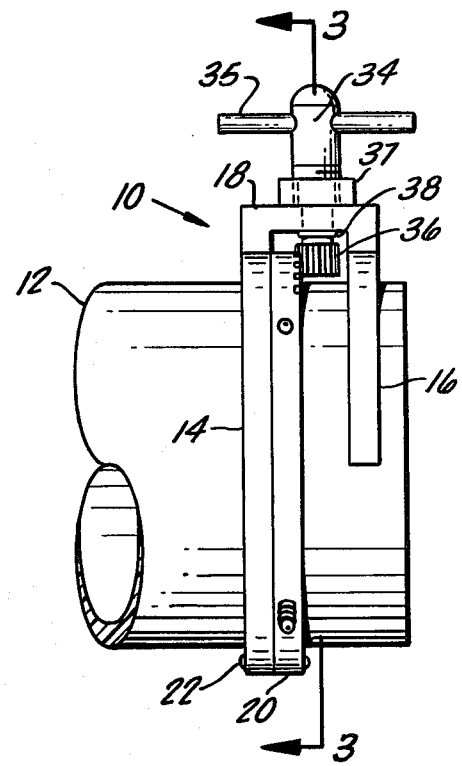
FIG. 2 is a side-elevational view thereof wherein a pipe is disposed therein in a cutting mode of operation.

Referring now to the preferred mode of the present invention, in the drawings of FIGS. 1 and 2 the numeral 10 designates generally a pipe-cutting tool, that is particularly suited for cutting plastic, rubber or the like, including very thin-walled metal pipe or tubing, as indicated at 12.

The cutting tool 10 is constructed so that it can be received over the end and disposed adjacent the selected cutting point. The design of said tool allows easy use thereof under very difficult conditions, such as when pipe is partially burried in the ground, when suspended above one's head, and various other difficult access situations.

Accordingly, said cutting tool 10 comprises a rotatable cutter head defined by an annular-support body member 14 which is adapted to be positioned over the pipe to be cut. A support guide means is also provided as a forwardly extending yoke member 16. Said yoke member engages the pipe forward of the body member and is integrally attached thereto by a bridge section 18, wherein the cutter head is stabilized during the cutting operation of the pipe 12.

That is, the cutting tool 10 is manually rotated in a back and forth movement about the peripheral surface of the pipe 12 thereby providing a back and forth saw like cutting action.

Pivotally attached to the central, lower portion of the body 14 is an arcuate cutting arm 20, wherein a pivot pin 22 passes through the lower end of the arm 20 and is fixedly received in said body 14. Thus, the arcuate cutting arm is allowed to fold inwardly of the head 10 during the operation and rotation of said head, at which time a cutting element engages the pipe or tube 12 disposed in said head. This cutting element, as disclosed in the preferred embodiment, comprises a cutting wire 24, generally of the piano-type wire. Said wire may be either a serrated or non-serrated-type wire, depending on the material to be cut. One end of the cutting wire 24 is attached to the upper mid-section of the cutting arm 20, wherein one end of the cutting wire is received in a bore 26 and is strung downwardly to a second lower-disposed bore 28. Both ends of the wire are provided with removable fastener means 30 to permit the wire to be readily changed when necessary. In order to provide a constant tension to the wire 24, the lower attached end includes a biasing means shown as a coil spring 32 positioned between the fastener 30 and the side of arm 20.

The cutting wire 24 is brought into cutting contact with the pipe's surface by an adjustable cutter means which comprises a key 34 rotatably mounted to the bridge member 18. The key includes a handle 35 at its upper end and a pinion gear 36 arranged at its lower end. Positioned between the pinion gear 36 and the underside of bridge 18 is a ring lock 38, whereby the key 34 is rotatably held within said bridge. The key is also provided with a threaded midsection 39, said threaded section being positioned adjacent the bridge 18, wherein a locking bar 37 is received on said threaded key so as to lock the key from rotation when necessary.

Figure 3:
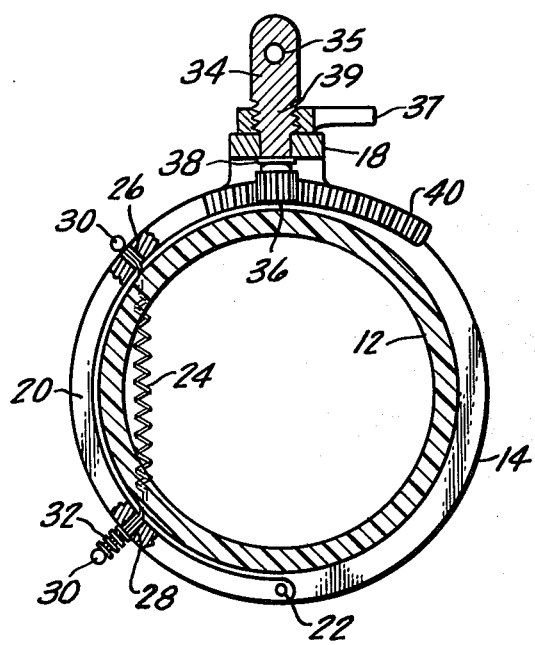
FIG. 3 is a cross-sectional view taken substantially along line 3 — 3 of FIG. 2, wherein the key-and-ratchet arrangement is illustrated.

That is, the pinion engages a gear rack 40 disposed on the free end of the cutter arm 20, as seen in FIG. 3. As the cutter wire cuts into the pipe 12, during the manual back and forth rotational movement of tool 10, an occasional tightening is required, wherein the locking bar 37 is released from engagement with bridge 18. This allows the pinion gear to be rotated, causing arm 20 to rotate about pivot pin 22 and forcing cutter wire 24 deeper into the cut kerf. The locking bar is then tightened against the bridge 18, wherein the key 34 can not rotate. At this time, the cutter head is manually actuated about the pipe 12, again causing the cutting wire 24 to cut a deeper kerf. This action is repeated until the wire cuts completely through pipe 12.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A manual pipe-cutting apparatus for use in cutting plastic, rubber and other non-metallic pipes or thin-wall metal tubing comprising:
    a annular-support body adapted to be positioned over a pipe to be cut;
    a support guide means formed as an integral part of said support body and extending forward thereof for engagement with said pipe;
    an arcuate cutting arm pivotably attached to said annular support body;
    pivotal means connecting said arm to said body;
    serated wire mounted to said cutting arm for direct engagement with said pipe;
    a key rotatably mounted to said support body having a pinion gear formed as part of said key;
    a gear rack disposed along one side of said cutting arm for engagement with said pinion gear; and
    locking means mounted on said key wherein said cutting arm is locked into place.

* * * * *